United States Patent [19]

Kayashima et al.

[11] Patent Number: 5,076,653

[45] Date of Patent: Dec. 31, 1991

[54] INFRARED OPTICAL FIBER, A METHOD OF MANUFACTURING THE SAME, AND AN OPTICAL FIBER CABLE USING THE SAME

[75] Inventors: Kazuhiro Kayashima; Fumikazu Tateishi; Koyoko Ohshima, all of Osaka; Masaru Ikedo, Nara, all of Japan

[73] Assignee: Matsushita Electric Industry Co., Ltd, Osaka, Japan

[21] Appl. No.: 568,385

[22] Filed: Aug. 16, 1990

Related U.S. Application Data

[63] Continuation-in-part of Ser. No. 495,657, Nov. 17, 1989, abandoned.

[30] Foreign Application Priority Data

Feb. 17, 1988 [JP] Japan ................................. 63-34204
Feb. 17, 1988 [JP] Japan ................................. 63-34208
Feb. 15, 1989 [JP] Japan ................. PCT/JP89/00151

[51] Int. Cl.$^5$ .............................................. G02B 6/16
[52] U.S. Cl. ................................... 385/109; 385/123; 385/142
[58] Field of Search ............... 350/96.29, 96.3, 96.34, 350/96.23; 264/1.5

[56] References Cited

U.S. PATENT DOCUMENTS

| | | | |
|---|---|---|---|
| 4,504,298 | 3/1985 | Yokota et al. | 350/96.34 X |
| 4,521,073 | 6/1985 | Murakami et al. | 350/96.34 |
| 4,583,821 | 4/1986 | Murakami et al. | 350/96.34 |
| 4,955,689 | 9/1990 | Fuller et al. | 350/96.34 |

OTHER PUBLICATIONS

A. Sa'ar et al., "*Optical and Mechanical Properties of Silver Halide Fibers*", Proceedings of SPIE-The International Society for Optical Engineering, vol. 843, Aug. 20-21, 1987.

Primary Examiner—John D. Lee
Assistant Examiner—John Ngo
Attorney, Agent, or Firm—Panitch Schwarze Jacobs & Nadel

[57] ABSTRACT

An infrared optical fiber is disclosed which has a composition ratio of silver chloride and silver bromide in the range of 30 to 70 percent by weight of silver chloride, and has a diameter of 0.5 mm or less. The infrared optical fiber has great mechanical strength, so that it does not burn because of degradation in the laser beam transmission capability, even after 2,000 times of repetitive bending with a curvature radius of 20 mm, which is the condition necessary for use within the interior of a body, and it exhibits excellent radiant optical characteristics. In particular, an infrared optical fiber with a diameter of 0.35 mm or less is preferred, because such an infrared optical fiber withstands over 10,000 times of repetitive bending under the same condition as above and can therefore be repeatedly used many times. Also, by applying an appropriate load to the infrared optical fiber, the infrared optical fiber, which is of straight shape free from curving and which has excellent radiant optical characteristics, can be produced stably with a short manufacturing period of time. Furthermore, an optical fiber cable using such an infrared optical fiber, in which the infrared optical fiber is housed in a protective tube containing a dry inert gas, can be repeatedly used under wet conditions of high humidity and can be stored under ambient conditions for a long period of time.

7 Claims, 9 Drawing Sheets

INFRARED OPTICAL FIBER, A METHOD OF MANUFACTURING THE SAME, AND AN OPTICAL FIBER CABLE USING THE SAME

This application is a continuation-in-part of now abandoned, U.S. patent application Ser. No. 445,657, filed Nov. 17, 1989, entitled "Infrared Optical Fiber And A Method of Manufacturing the Same".

BACKGROUND OF THE INVENTION

1. Field of the Invention

This invention relates to an infrared optical fiber used as an optical transmission line in a laser beam machine or a laser medical instrument, and to a method of manufacturing the infrared optical fiber. This invention also relates to an optical fiber cable using the infrared optical fiber.

2. Description of the Prior Art

In medical operations using laser cutting and laser beams, various kinds of laser beams are currently used according to the purpose of the operation. In the latter case, a carbon dioxide ($CO_2$) laser beam is used because of its high absorptivity in the living organism and its superior incising and vaporizing capabilities.

As a means for transmitting the $CO_2$ laser beam to the target, a mirror articulated optical wave-guide using a combination of mirrors has previously been used, because quartz optical fibers as used for telecommunications cannot transmit the $CO_2$ laser beam, which has a wavelength of 10.6 $\mu$m and so falls within the category of medium infrared radiation.

However, since the mirror articulated optical wave-guide lacks operatability for precise medical operations, many efforts have been made to replace it with an infrared optical fiber. As a result, some infrared optical fibers have been put into practical use for general surgery, but it still cannot be said that these infrared optical fibers have sufficient flexibility.

In particular, there has recently been a need for a so-called "$CO_2$ laser endoscope" that enables the treatment of internal organs to be performed without an external medical operation for cutting open the body, by inserting the infrared optical fiber along with the endoscope into the interior of the body to direct the $CO_2$ laser beam to the diseased part, but the current infrared optical fibers completely lack flexibility for this application. The infrared optical fiber used in this application is required to have sufficient flexibility so as to be easily bent within the interior of the body, as well as the power transmission capability for incising and vaporizing the diseased part. As to the conditions of use for the endoscopes currently used, it is considered that what is required in cases where an infrared optical fiber is repeatedly used many times is flexibility which can retain the power transmission capability against repeated flexing of approximately 10,000 times with a curvature radius of 20 mm. In case where an infrared optical fiber is used only once or a few times at most, flexibility which confers the power transmission capability against repeated flexing of about 2000 times with a curvature radius of 20 mm on the infrared optical fiber is generally sufficient. It is also important for the infrared optical fibers to have excellent optical characteristics such as a transmittance and a radiation spread angle of the laser beam.

Metal halides such as thallium halide, silver halide and cesium halide have been previously used as infrared optical fiber materials which can transmit the $CO_2$ laser beam with high efficiency, but these materials generally have inferior mechanical bending characteristics and are easily breakable. Since the infrared optical fiber formed silver halide is relatively flexible and not easily breakable, various researches are currently underway for improvement. A report has been made of an example of infrared optical fibers formed from materials with improved elongation at rupture by adding 0.01 to 10 percent by weight of silver chloride to silver bromide or of silver bromide to silver chloride for improved mechanical bending characteristics. However, while the infrared optical fiber of this composition does not break with bending of a radius of as small as 20 mm because of its great elongation rate, there is the problem that it is susceptible to plastic deformation with bending because of its small yield strength, causing fusing at the deformed portion during transmission of the laser beam or resulting in degradation in the optical characteristics.

There has also been a report of an example of infrared optical fibers formed to have a diameter of 0.9 mm from materials with mechanical strength improved by using silver chloride and silver bromide in an equivalent mole ratio in its composition, but it has the problem that after a slight number of repetitive bending with a radius of 20 mm, it is fused during transmission of the laser beam; the optical characteristics deteriorate; and sometimes, the optical fiber ruptures.

Furthermore, with regard to the method of manufacturing infrared optical fibers, the conventional hot extrusion (o.f., FIG. 5) of metal halide materials has the problem that the infrared optical fibers are molded in a corrugated form and the extrusion speed is slow. This tendency is particularly noted in the extrusion of silver halide materials with improved mechanical strength, and therefore, the extrusion of optical fibers with excellent optical characteristics has not been possible.

SUMMARY OF THE INVENTION

The infrared optical fiber of this invention, which overcomes the above-discussed and numerous other disadvantages and deficiencies of the prior art, has a composition ratio of silver chloride and silver bromide in the range of 30 to 70 percent by weight of silver chloride, and has a diameter of 0.5 mm or less.

In a preferred embodiment, the aforementioned infrared optical fiber has a diameter of 0.35 mm or less.

In a preferred embodiment, the absorption coefficient of the aforementioned infrared optical fiber is $10^{-3}$ (1/cm) or less.

In a preferred embodiment, the aforementioned infrared optical fiber is substantially free of foreign particles with a diameter of more than 3 $\mu$m.

The method of manufacturing an infrared optical fiber of this invention is a method wherein silver halide crystals are used to form the infrared optical fiber of linear shape by hot extrusion with the use of dies, the infrared optical fiber being subjected to a tensile load which is greater than the yield stress but smaller than the rupture stress of the infrared optical fiber.

In a preferred embodiment, the aforementioned metal silver halide has a composition ratio of silver chloride and silver bromide in the range of 30 to 70 percent by weight of silver chloride.

In a more preferred embodiment, the aforementioned dies have a diameter of 0.5 mm or less.

In a still more preferred embodiment, the aforementioned dies have a diameter of 0.35 mm or less.

In a preferred embodiment, the aforementioned extruded infrared optical fiber is subjected to heat treatment in an atmosphere of dry inert gas at a temperature of 100° C. to 200° C. for a period of 10 to 30 hours.

In a more preferred embodiment, the aforementioned dry inert gas is nitrogen.

The optical fiber cable of this invention comprises a protective tube and an infrared optical fiber housed in the protective tube, the infrared optical fiber having a composition ratio of silver chloride and silver bromide in the range of 30 to 70 percent by weight of sliver chloride, and having a diameter of 0.5 mm or less, wherein the interior of the protective tube is filled with a dry inert gas to prevent the infrared optical fiber from being affected by moisture.

In a preferred embodiment, the aforementioned infrared optical fiber has a diameter of 0.35 mm or less.

In a preferred embodiment, the aforementioned infrared optical fiber is substantially free of foreign particles with a diameter of more than 3 $\mu$m.

In a preferred embodiment, the aforementioned dry inert gas is nitrogen.

Thus, the invention described herein makes possible the objectives of (1) providing an infrared optical fiber with high flexibility and excellent optical characteristics; (2) providing a method of manufacturing and infrared optical fiber, by which infrared optical fibers of straight shape free from curving with excellent radiant optical characteristics can be produced stably with a short manufacturing period of time; and (3) providing an optical fiber cable using such an infrared optical fiber, which can be repeatedly used under wet conditions of high humidity and can be stored under ambient conditions for a long period of time.

This invention is basically directed to an infrared optical fiber which has a composition ratio of silver chloride (AgCl) and silver bromide (AgBr) in the range of 30 to 70 percent by weight of silver chloride, and has a diameter of 0.5 mm or less. This invention is also directed to a method of manufacturing an infrared optical fiber, comprising metal halide crystals and a means for forming infrared optical fibers of linear shape by hot extrusion with the use of dies, characterized in that the infrared optical fiber is subjected to a tensile load which is greater than the yield stress but smaller than the rupture stress of the infrared optical fiber. This invention is also directed to an optical fiber cable in which the above-mentioned infrared optical fiber is housed in a protective tube, the interior of which is filled with a dry inert gas such as nitrogen.

The infrared optical fiber, which has a composition ratio of silver chloride and silver bromide in the range of 30 to 70 percent by weight of silver chloride, and has a diameter of 0.5 mm or less, will not yield plastic deformation with bending or a curvature radius of 20 mm which is an operating condition for practical use as a "laser endoscope".

Also, because the infrared optical fiber is produced by hot extrusion with a tensile load greater than the yield stress being applied thereto, the infrared optical fiber can be formed in a straight shape.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The following describes in detail an infrared optical fiber and a method of manufacturing the infrared optical fiber according to this invention, as well as the various characteristics of the infrared optical fiber, with reference to the accompanying drawings.

Figure 1:
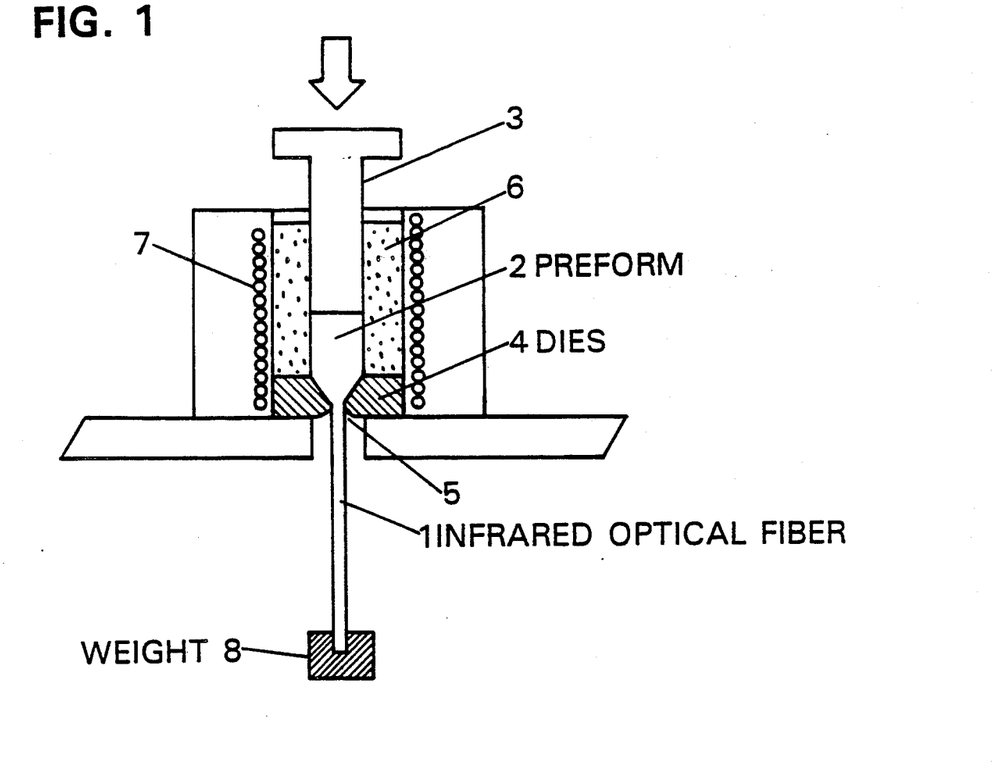
FIG. 1 is a schematic cross-sectional view showing an extruder used for the infrared optical fiber in one example of this invention.

Silver chloride and silver bromide are mixed with each other to have a composition ratio in the range of 30 to 70 percent by weight of silver chloride, and single crystals thereof are prepared by the Bridgman method. Then, an infrared optical fiber 1 is produced by use of an extruder as shown in FIG. 1. A preform 2 is a base crystal obtained by forming the single crystal in a cylindrical shape with a diameter of approximately 8 mm. The reference numeral 3 is a pressurizing ram, and reference numeral 4 are dies having a nozzle 5 to determine the fiber diameter. In this example, a nozzle with a diameter of 0.3 to 0.5 mm is used. The dies 4 are formed from silicon nitride ceramics which has high hardness and excellent corrosion resistance to halide materials and sodium thiosulfate ($Na_2S_2O_3$) for cleaning halide materials. The reference numeral 6 is a container for housing the preform, and the reference numeral 7 is a heater for heat controlling the container 6. A weight 8 is used for applying a tensile load to the infrared optical fiber.

Next, the procedure for extrusion of the infrared optical fiber will be explained below. First, the extruding temperature is set within the range of 150° to 220° C. After the temperature has stabilized, a pressure of 5 to 15 ton/cm$^2$ is applied to the preform 2 by the use of a hydraulic press, and while applying an additional load to the infrared optical fiber 1 by the weight 8, the infrared optical fiber 1 is produced. The weight 8 has a weight that can apply a load greater than the yield stress and smaller than the rupture strength of the infrared optical fiber. A weight of 300 g within the above load range is suitable for an infrared optical fiber with a diameter of 0.3 mm.

Figure 5:
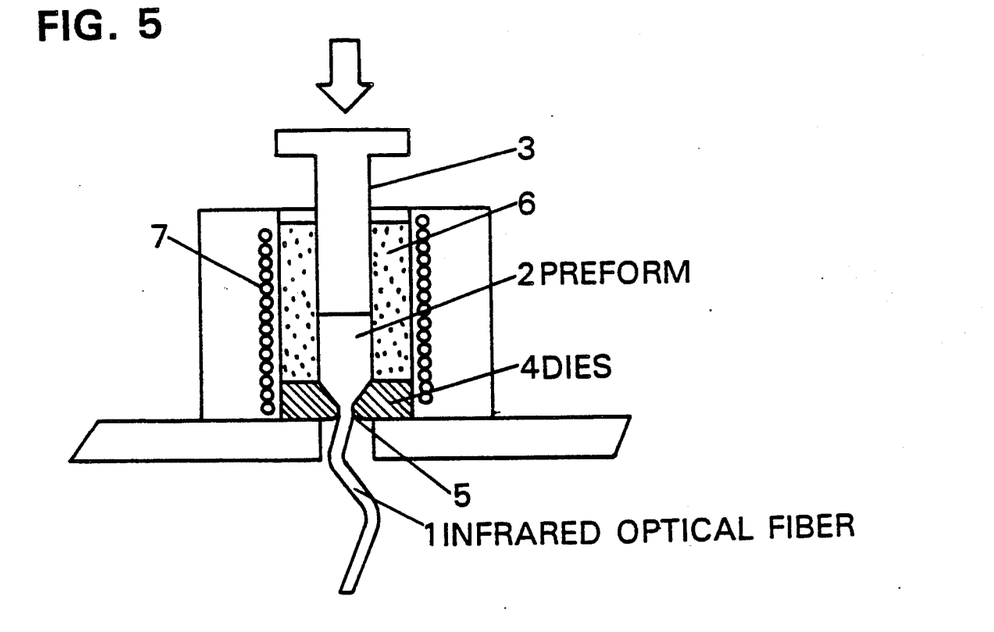
FIG. 5 is a schematic cross-sectional view showing a conventional extruder.

In a conventional method in which no tensile load is applied, infrared optical fibers are molded in a corrugated form as shown in FIG. 5, thus having the problem that the laser beam is radiated from the infrared optical fiber over a wide angle of 20 to 30 degrees and that the production speed is slow. This is because the hole of the nozzle 5 is too small for precise machining of the hole, hence difficulty in obtaining an ideal hole shape, and also because the silver chloride-silver bromide materials exhibit great mechanical strength.

By forming while applying the tensile load of 300 g, it is possible to produce the infrared optical fiber having a straight shape, no corrugations, and excellent radiant optical characteristics with a radiation spread angle of 14 degrees, as compared with 20 to 30 degrees in the prior art, at the speed two times faster than the conventional method.

Figure 2:
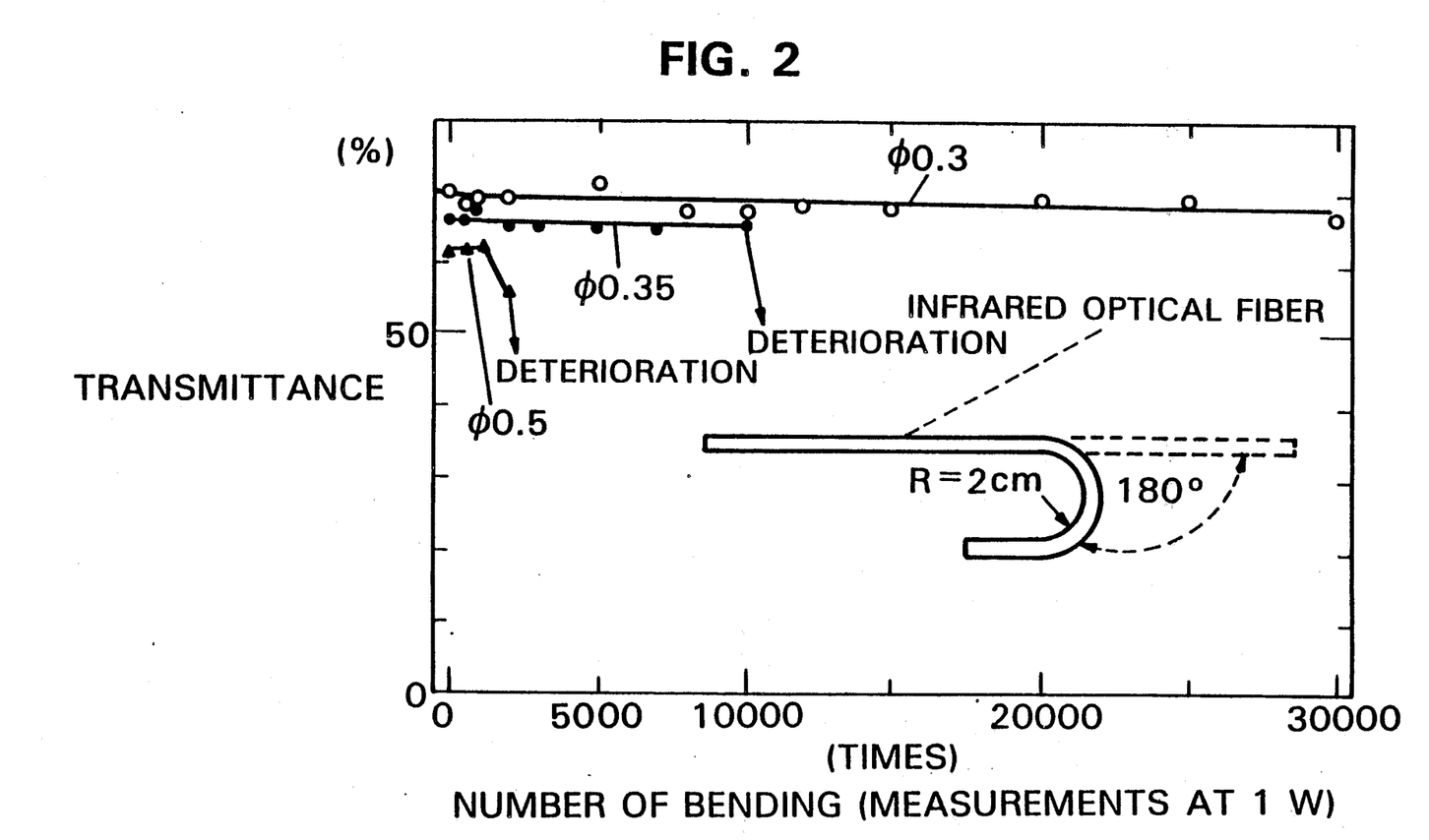
FIG. 2 is of characteristic curves showing the relationship between the diameter of the infrared optical fiber in the above example and the secular change of the transmittance thereof in a repetitive bending test.

The following will now describe the relationship between the diameter of the infrared optical fiber 1 thus produced and the repetitive bending characteristics thereof. For the infrared optical fiber 1 subjected to the bending test, silver chloride-silver bromide fibers were used with a composition ratio corresponding to 43 percent by weight of silver chloride, of three different diameters of 0.5 mm, 0.35 mm, and 0.3 mm, and of a length of 1.5 m. As shown in FIG. 2, the fibers were bent with a bending radius of 20 mm and a bending angle of 180 degrees to approximate the actual operating conditions for a laser endoscope, and the change in the transmittance was observed. As shown in this figure, the infrared optical fiber with a diameter of 0.5 mm showed a drop in the transmittance after 2,000 times of bending, and burnt at the bent portion during the measurement of the transmittance after 3,000 times of bending. The infrared optical fiber with a diameter of 0.35 mm showed no drop in the transmittance even after 10,000 times of bending, but burnt at the bent portion during the measurement of the transmittance after 12,000 times of bending. With the infrared optical fiber with a diameter of 0.3 mm, no burning was observed even after 30,000 times of bending, and the drop in the transmittance was less than 2 percent. As a guideline for the required flexibility in cases where an infrared optical fiber is repeatedly used many times, supposing that the life of the optical cable housing the infrared optical fiber is one year, that the times of bending for one medical treatment is 50, and that 200 treatments are performed per year, it is considered that the infrared optical fiber is required to have a flexibility that withstands about 10,000 times of bending. The infrared optical fiber with a diameter of 0.35 mm or less is capable of, under actual operating conditions, withstanding more than 10,000 times of bending and yet retaining the power transmission capability with negligible drop in the transmittance and other radiant optical characteristics, and is expected to satisfactorily meet the requirements for use within the interior of a body. In cases where an infrared optical fiber is used only once or a few times at most, the infrared optical fiber with a diameter of 0.5 mm is also available for medical operations because it withstands about 2,000 times of bending without significantly degrading the radiant optical characteristics.

Figure 3:
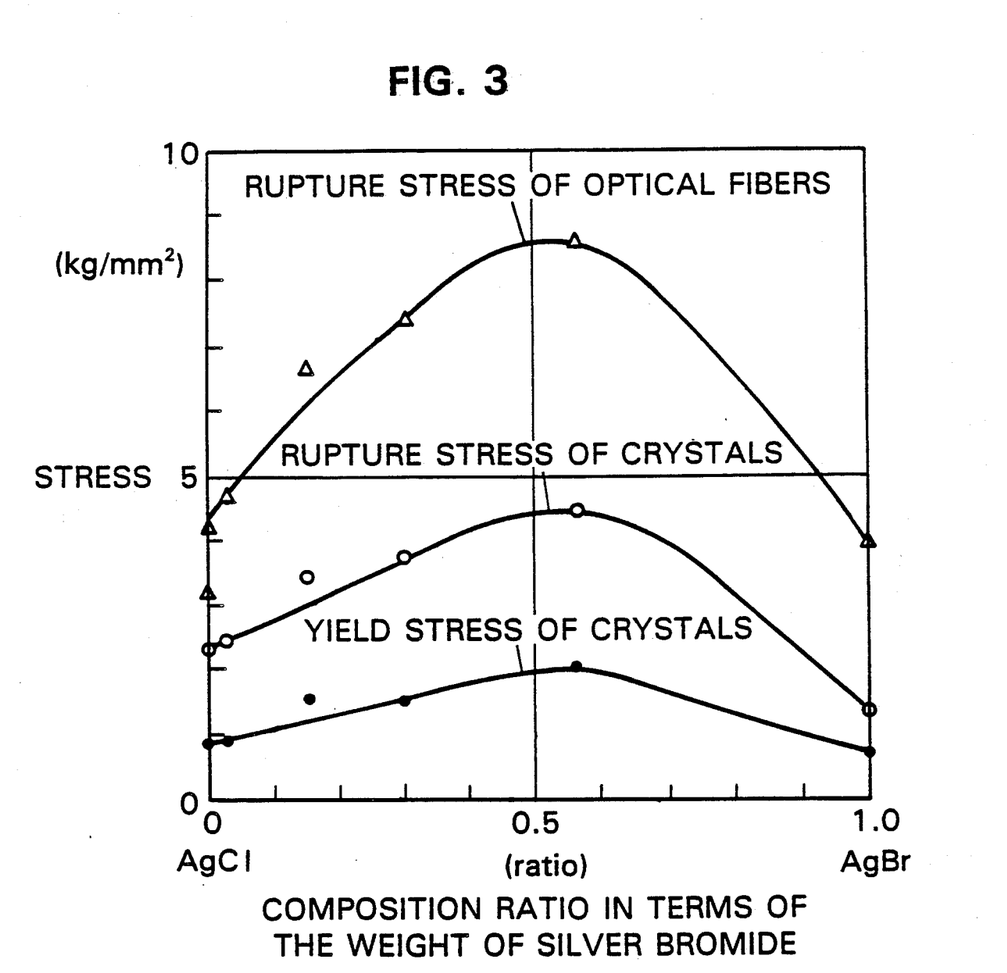
FIG. 3 is of characteristic curves showing the rupture stress of the infrared optical fiber and the yield stress and rupture stress of the silver chloride - silver bromide single crystal with respect to the concentration of silver bromide.

The following description deals with materials for the infrared optical fiber from the viewpoint of the composition ratio. FIG. 3 shows the rupture stress of the infrared optical fiber and the yield stress and rupture stress of the silver chloride-silver bromide mixed crystal with respect to the concentration (percent by weight) of silver bromide. The infrared optical fiber exhibits a greater mechanical strength as the composition ratio approaches the center of the graph.

Figure 4:
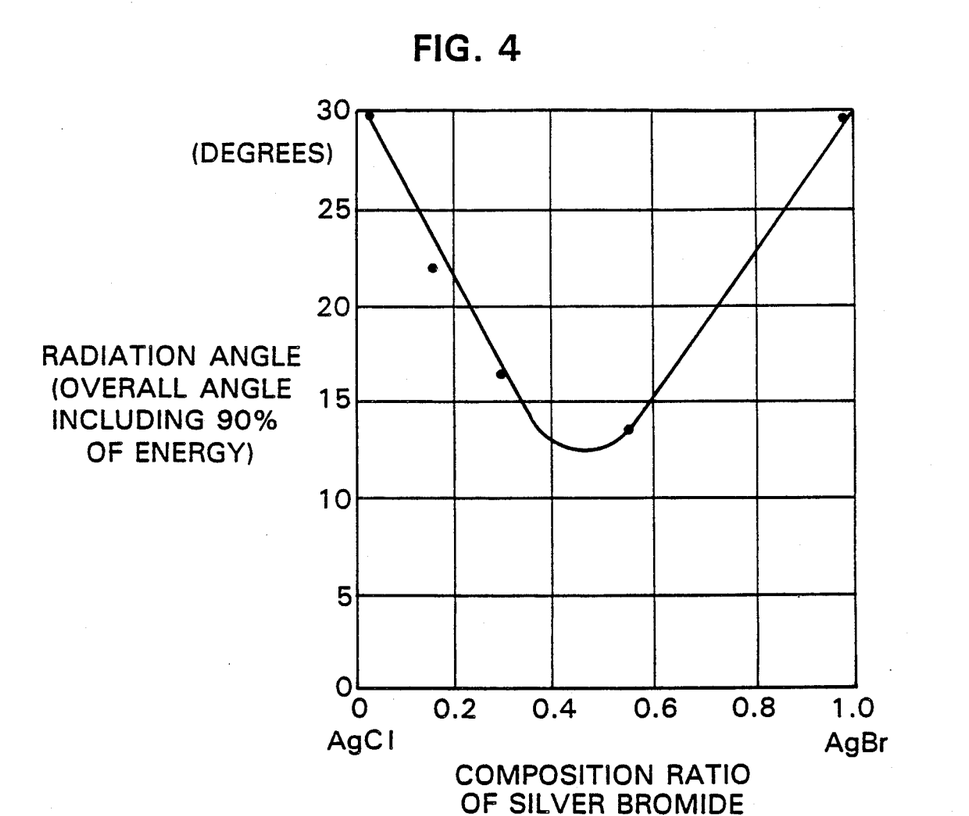
FIG. 4 is of a characteristic curve showing the relationship between the composition ratio and the radiation spread angle of the infrared optical fiber.

This is also true of the optical characteristics. That is, because degradation in the optical characteristics is caused by excessive plastic deformation, it is considered that the composition ratio at the center of the graph where the silver chloride-silver bromide material exhibits great yield stress and resistance to plastic deformation is suitable for the material used for the infrared optical fiber. To prove this, infrared optical fibers of various composition ratios were produced to evaluate their optical characteristics. FIG. 4 shows the relationship between the composition ratio and the radiant optical characteristics. As shown in this figure, the radiation angle of as infrared optical fiber containing 3 percent by weight of silver bromide takes an extremely great value of 30 degrees, and the radiation angle becomes smaller as the composition ratio approaches the center of the graph, thereby attaining more excellent radiant optical characteristics. Although not shown, the tendency was noted that a greater transmittance was also provided as the composition ratio approached the center of the graph.

In the above example, the description has been mainly directed to the degradation in the radiant optical characteristics is connection with bending in the actual use of the optical fiber. However, because the degradation in the radiant optical characteristics such as an increase of the radiation spread angle and a decrease in the transmittance can also be caused by the stress applied during the production of the infrared optical fiber such as the extrusion and end polishing processes, the most suitable infrared optical fiber is obtained in the concentration range of 30 to 70 percent by weight for the silver chloride-silver bromide where great yield stress is provided.

The following will now describe the laser beam absorption coefficient and power transmission capability of the infrared optical fiber. The absorption coefficient was obtained from the elongation of the infrared optical fiber by the calorimetric measurements, while the power transmission capability was determined by increasing the power of laser beam introduced into the infrared optical fiber and measuring the decayed laser beam output. As a result of the comparison of these two characteristics, it was found that the laser beam output of 10 W required the absorption coefficient of the infrared optical fiber of $10^{-3}$ (1/cm) or less. From this, it can be seen that an infrared optical fiber having an absorption coefficient of $10^{-3}$ (1/cm) or less is required to obtain a laser beam transmission power of 10 W which is considered necessary for the incision and vaporization of a diseased part.

The following will further describe a relationship between the diameter and power transmission capability of the infrared optical fiber. The power transmission capability was determined by increasing the input power of a laser beam and measuring the maximum input power of the laser beam by which the infrared optical fiber burned out within the initial 5 minutes. The infrared optical fibers which were used as the sample in this experiment had a composition ratio of silver chloride and silver bromide corresponding to 43 percent by weight of silver chloride. As a result, it was found that the maximum input power of a laser beam rises with an increase in the diameter of the infrared optical fiber. For example, the maximum input power of a laser beam was 230 W for the infrared optical fiber with a diameter of 0.5 mm, 170 W for the infrared optical fiber with a diameter of 0.4 mm, and 120 W for the infrared optical fiber with a diameter of 0.3 mm.

Figure 6:
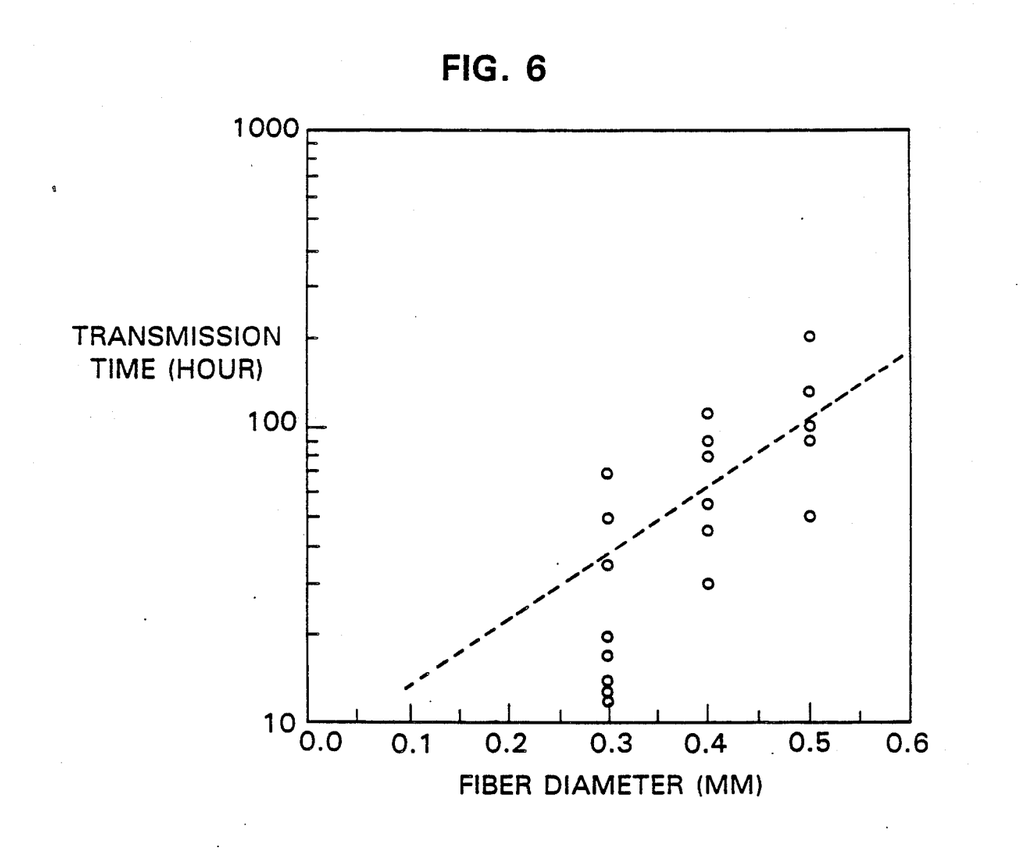
FIG. 6 is a graph showing the relationship between the transmission time and the diameter of infrared optical fibers.

Moreover, the same infrared optical fibers as mentioned above were examined with respect to the laser transmission time at a constant input power of the laser beam. The results obtained are shown in FIG. 6 as the relationship between the laser transmission time and the diameter of the infrared optical fibers. The input power of the laser beam was set to be 20 W. As can be seen from FIG. 6, the laser transmission time has a general tendency to increase with an increase in the diameter of the infrared optical fiber. For example, the infrared optical fiber with a diameter of 0.5 mm can transmit laser beams with an input power of 20 W for an average period of 100 hours or more.

Figure 7:
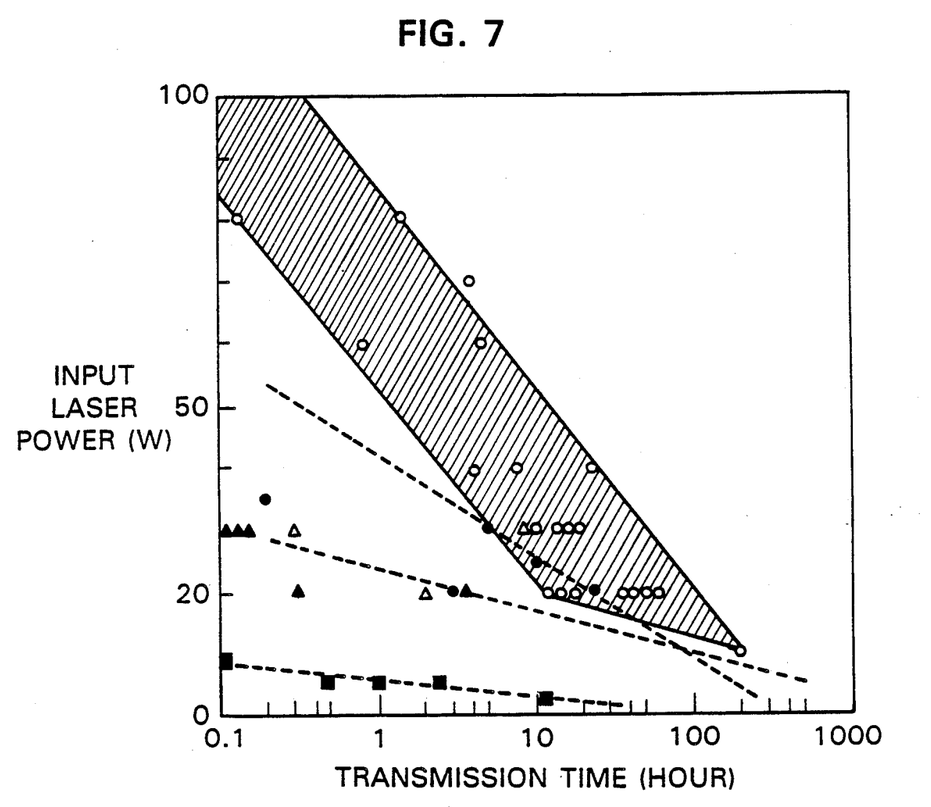
FIG. 7 is a graph showing the relationship between the input laser power and the transmission time with respect to the infrared optical fibers substantially free of foreign particles and the infrared optical fibers having foreign particles added intentionally thereto.

The inventors have found that there is a relationship between the diameter of foreign particles contained in the infrared optical fiber and the working life of the infrared optical fiber. The working life was determined by introducing a laser beam with a constant input power into the infrared optical fiber and measuring the transmission time for which the infrared optical fiber can transmit the laser beam without burning out. The results obtained are shown in FIG. 7. The infrared optical fibers used in this experiment had a diameter of 0.3 mm, a length of 20 to 25 cm, and a composition ratio of silver chloride and silver bromide corresponding to 43 percent by weight of silver chloride. In FIG. 7, the mark "○" represents the data of the infrared optical fibers to which foreign particles were not intentionally added; the mark " " represents the data of the infrared optical fibers to which silicon carbide particles with a diameter of 40 μm were intentionally added as the foreign particles; the mark " " represents the data of the infrared optical fibers to which silicon carbide particles with a diameter of 16 μm were intentionally added as the foreign particles; the mark "Δ" represents data of the infrared optical fibers to which aluminum oxide particles with a diameter of 10 μm were intentionally added as the foreign particles; and the mark " " represents the data of the infrared optical fibers to which silicon carbide particles with a diameter of 3 μm were intentionally added as the foreign particles.

As can be seen from FIG. 7, the data of the infrared optical fibers containing no foreign particles distributed in the area hatched with oblique lines, indicating that the infrared optical fibers of this invention were substantially free of foreign particles with a diameter of more than 3 μm. Moreover, it was found that these infrared optical fibers had a working life of 100 hours or more at an input laser power of 10 W, which is that required for practical use.

The inventors have further found that the shelf life (i.e., storage life) of infrared optical fibers can be increased by heat treatment of the infrared optical fibers. The shelf life of infrared optical fibers were determined by the change in transmittance at an appropriate time after the begining of storage. The experiment was conducted as follows.

Figure 8:
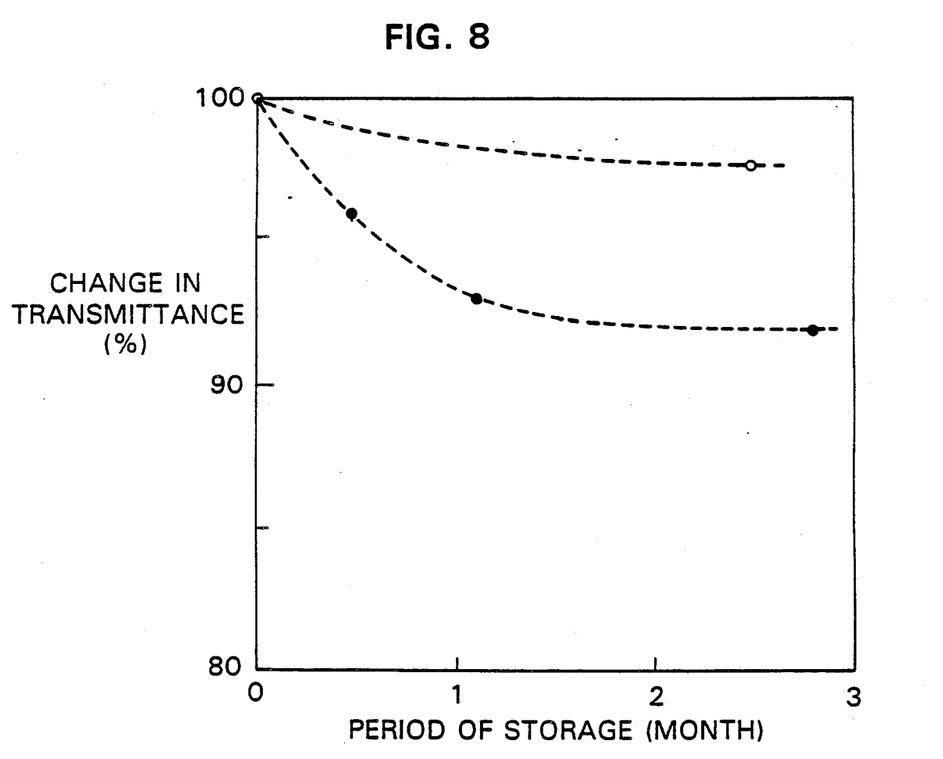
FIG. 8 is a graph showing the effect of heat treatment on the transmittance of infrared optical fibers.

A pair of the infrared optical fibers which were used as the sample in this experiment had a diameter of 0.3 mm, a length of 1.5 m, and a composition ratio of silver chloride and silver bromide corresponding to 43 percent by weight of silver chloride. One of the infrared optical fibers was subjected to heat treatment in an atmosphere of dry nitrogen gas at a temperature of 160° C. for a period of 22 hours. The other sample was not subjected to the heat treatment. These samples were then allowed to stand in an atmosphere of 95% humidity for 3 months. At several appropriate times after the beginning of storage, these samples were examined with respect to the change in transmittance. The results obtained are shown in FIG. 8. The mark "○" represents the data of the infrared optical fiber which was subjected to heat treatment; and the mark " " represents the data of the infrared optical fiber which was not subjected to heat treatment.

As can be seen from FIG. 8, the change in transmittance after about 3 months was only about 2.5% for the infrared optical fiber which was subjected to heat treatment, and about 9% for the infrared optical fiber which was not subjected to heat treatment. This fact indicates that heat treatment has the effect of preventing the change in the transmittance of infrared optical fibers, thereby obtaining a long shelf life. The heat treatment is usually conducted in an atomsphere of dry inert gas such as nitrogen at a temperature of 100° C. to 200° C. for a period of 10 to 30 hours. The temperature and period of heat treatment depend on the composition ratio and diameter of the infrared optical fiber to be treated.

The inventors have further found that the decrease in the transmittance of infrared optical fibers is suppressed in an atmosphere of low humidity. The experiment was conducted as follows.

Figure 9:
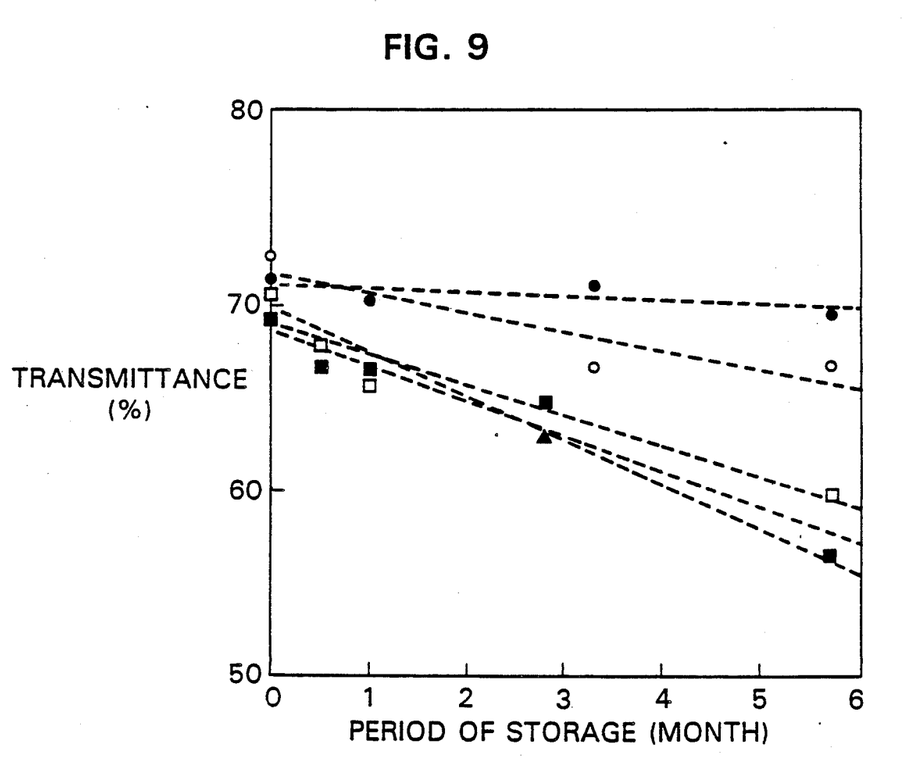
FIG. 9 is a graph showing the change in the transmittance of infrared optical fibers which are placed under various conditions.

The infrared optical fibers which were used as the sample in this experiment had a diameter of 0.3 mm, a length of 1.5 m, and a composition ratio of silver chloride and silver bromide corresponding to 43 percent by weight of silver chloride. These infrared optical fibers were allowed to stand in various atmospheres and the transmittance of the infrared optical fibers was measured at several appropriate times after the beginning of storage. The results obtained are shown in FIG. 9. In FIG. 9, the mark " " represents the data of the infrared optical fiber which was allowed to stand in an atmosphere of dry nitrogen of 5% humidity; the mark "○" represents the data of the infrared optical fiber which was allowed to stand in an ambient atmosphere of 30% humidity; the mark "□" represents the data of the infrared optical fiber which was allowed to stand in an atmosphere of 95% humidity; the mark " " represents the data of the infrared optical fiber which was allowed to stand in an atmosphere over an aqueous solution of hydrochloric acid; and the mark " " represents the data of the infrared optical fiber which was allowed to stand in an atmosphere saturated with carbon dioxide and moisture.

As can be seen from FIG. 9, the atmosphere of high humidity can cause the decrease in the transmittance of infrared optical fibers, regardless of whether the atmosphere contains an active gas or not. Accordingly, the infrared optical fiber of this invention can have a long shelf life when stored in an atmosphere containing a dry inert gas such as nitrogen. In practical use, the infrared optical fiber is usually housed in a protective tube to form an optical fiber cable. Therefore, the interior of the protective tube should be filled with a dry inert gas such as nitrogen.

Based on this knowledge, this invention provides an optical fiber cable using the infrared optical fiber mentioned above. The following will describe such an optical fiber cable by reference to FIG. 10.

Figure 10:
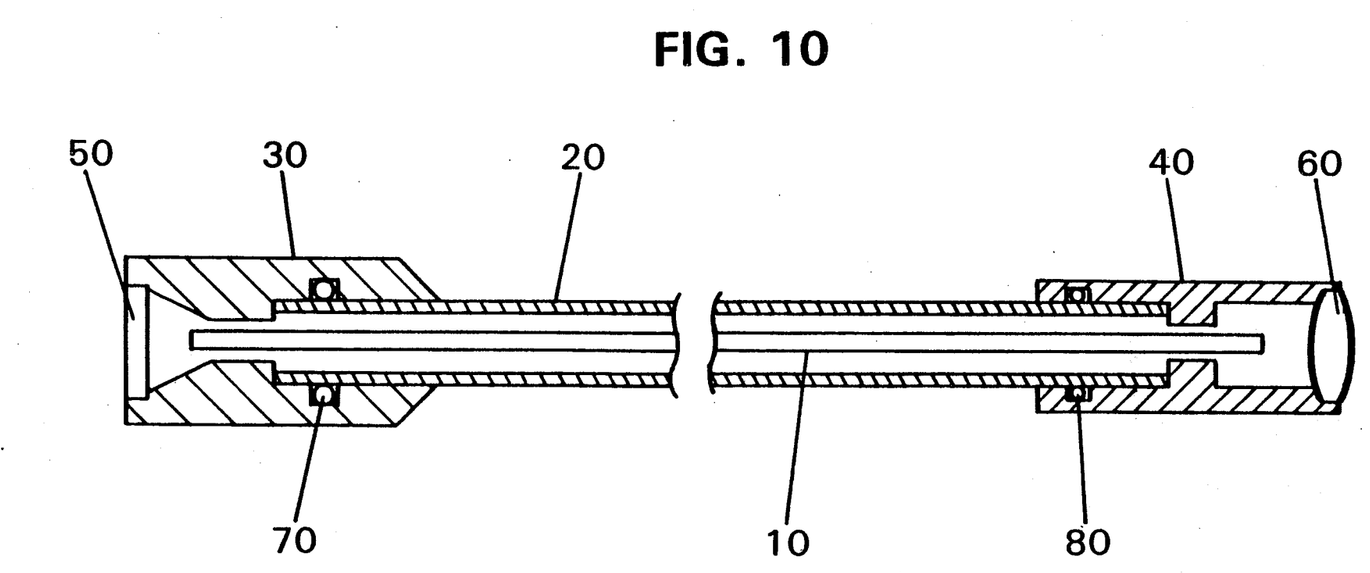
FIG. 10 is a schematic cross-sectional view showing an optical fiber cable of this invention.

FIG. 10 shows an optical fiber cable of this invention. The optical fiber cable has an infrared optical fiber 10 for transmitting infrared laser beams, which is housed in a protective tube 20. The total length of the optical fiber cable is usually in the range of 1 to 5 m.

The infrared optical fiber 10 has a composition ratio of silver chloride and silver bromide in the range of 30 to 70 percent by weight of silver chloride. The diameter of the infrared optical fiber 10 is in the range of 0.5 mm or less. The infrared optical fiber 10 may be subjected to heat treatment in an atmosphere of dry inert gas, which will bring an increase in the shelf life of the optical fiber cable.

The protective tube 20 is made of stainless steel and has a sufficiently flexible structure to withstand repeated bending with a small curvature radius. The protective tube 20 has at its one end a connector 30 having a window 50 which functions as an inlet for introducing infrared laser beams. The connector 30 serves as an attached portion for connecting to a laser-beam emitting apparatus, so that the outer diameter of the connector 30 is usually in the range of 5 to 10 mm. The other end of the protective tube 20 is fitted into a holder 40 having a condenser lens 60 which gathers the infrared laser beams on the diseased part of a subject. The outer diameter of the holder 40 is usually in the range of 1.2 to 2.5 mm. The focal length of the condenser lens 60 is usually in the range of 2.5 to 10 mm. The materials for the window 50 and the condenser lens 60 are selected from those which can transmit infrared laser beams without bringing loss of the laser power. Examples of such materials include zinc selenide.

The protective tube 20 is hermetically sealed by elastic members 70 and 80 at the respective ends. The elastic members 70 and 80 are made of an elastic material such as indium. The use of the elastic members 70 and 80 ensures that the protective tube 20 is airtight. The interior of the protective tube 20 is filled with a dry inert gas such as nitrogen.

The optical fiber cable having such a structure is, for example, fabricated as follows.

First, soft metal such as indium is wound around the side face of the window 50. The window 50 is then inserted into the connector 30, while applying heat thereto, and then fixed at the end of the connector 30. In the same manner, the condenser lens 60 is fixed at the end of the holder 40. The elastic members 70 and 80 are set into the grooves provided on the inner face of the connector 30 and the holder 40, respectively.

Next, in an atmosphere of dry inert gas such as nitrogen, the infrared optical fiber 10 is inserted into the protective tube 20. Then, one end of the protective tube 20 is pressed axially into the connector 30, while being rotated around the axis of the protective tube 20. In the same manner, the other end of the protective tube 20 is also pressed axially into the holder 40, resulting in an optical fiber cable as shown in FIG. 10.

The optical fiber cables obtained in this manner were examined in a life test with respect to the transmission performance. The results showed that the optical fiber cable using an infrared optical fiber, which has a diameter of 0.3 mm and a composition ratio corresponding to 43 percent by weight of silver chloride, provided a working life of 10 hours or longer at an output-laser power level of 10 W. Moreover, the optical fiber cable using the same infrared optical fiber as mentioned above, except that it was subjected to heat treatment in an atmosphere of nitrogen gas at a temperature of 150° C. for a period of 20 hours, provided an about 4 times shelf life as compared with the optical fiber cable using an infrared optical fiber which was not subjected to heat treatment. This is because a decrease in the transmittance of the infrared optical fiber used therein was suppressed.

As described above, the optical fiber cable of this invention has a very long working life, because the infrared optical fiber used therein is placed in an atmosphere of dry inert gas. If the infrared optical fiber is subjected to heat treatment, the optical fiber cable using such an infrared optical fiber has an improved shelf life, because a decrease in the transmittance of the infrared optical fiber is retarded.

Accordingly, the optical fiber cable of this invention can be repeatedly used under wet conditions of high humidity, which are encountered with practical use as a "laser endoscope". Moreover, the optical fiber cable of this invention can be stored under ambient conditions for a long period of time without the need to provide any particular means for preventing a decrease in the transmittance of the infrared optical fiber.

According to this invention, when a composition ratio which provides great yield stress is selected for the material used for the infrared optical fiber and the diameter of the thin infrared optical fiber is set to 0.35 mm or less, it is possible to obtain an infrared optical fiber which has a great mechanical strength, so that it does not burn because of degradation in the laser beam transmission capability, even after 10,000 times of repetitive bending with a curvature radius of 20 mm which is the actual operating condition, and it exhibits excellent optical characteristics such as a transmittance and a radiation spread angle. Also, by applying an appropriate tensile load to the infrared optical fiber when extruding it, an infrared optical fiber, which is of a straight shape free from curving and which has excellent optical characteristics, can be produced stably with a short manufacturing period of time. Furthermore, according to this invention, an optical fiber cable using the infrared optical fiber is obtained which can be repeatedly used under wet conditions of high humidity and can be stored under ambient conditions for a long period of time, because the infrared optical fiber is housed in a protective tube containing a dry inert gas.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in this invention, including all features that would be treated as equivalents thereof by those skilled in the art to which this invention pertains.

What is claimed is:

1. An unclad infrared optical fiber which has a composition ratio of silver chloride and silver bromide in the range of 30 to 70 percent by weight of silver chloride, and which has a diameter of 0.5 mm or less and is substantially free of foreign particles with a diameter of more than 3 $\mu$m.

2. An unclad infrared optical fiber as set forth in claim 1, which has a diameter of 0.35 mm or less.

3. An unclad infrared optical fiber as set forth in claim 1, wherein the absorption coefficient of the infrared optical fiber is $10^{-3}$ (1/cm) or less.

4. An optical fiber cable comprising a protective tube and an infrared optical fiber housed in said protective tube, said infrared optical fiber having a composition ratio of silver chloride and silver bromide in the range of 30 to 70 percent by weight of silver chloride, and having a diameter of 0.5 mm or less, wherein the interior of said protective tube is filled with a dry inert gas to prevent said infrared optical fiber from being affected by moisture.

5. An optical fiber cable according to claim 4, wherein said infrared optical fiber has a diameter of 0.35 mm or less.

6. An optical fiber cable according to claim 4, wherein said infrared optical fiber is substantially free of foreign particles with a diameter of more than 3 $\mu$m.

7. An optical fiber cable according to claim 4, wherein said dry inert gas is nitrogen.

* * * * *

UNITED STATES PATENT AND TRADEMARK OFFICE
CERTIFICATE OF CORRECTION

PATENT NO. : 5,076,653
DATED : December 31, 1991
INVENTOR(S) : Kazuhiro Kayashima et al.

It is certified that error appears in the above-identified patent and that said Letters Patent is hereby corrected as shown below:

On the Title page,

At item [75] "Koyoko" should read --Kiyoko--.

At item [63] "495,657" should read --445,657--.

Signed and Sealed this

Twenty-fifth Day of May, 1993

*Attest:*

MICHAEL K. KIRK

*Attesting Officer*     *Acting Commissioner of Patents and Trademarks*